(12) United States Patent
Andrews et al.

(10) Patent No.: US 11,665,330 B2
(45) Date of Patent: May 30, 2023

(54) DYNAMIC-BASELINE IMAGING ARRAY WITH REAL-TIME SPATIAL DATA CAPTURE AND FUSION

(71) Applicant: Dell Products L.P., Round Rock, TX (US)

(72) Inventors: Maxwell S. Andrews, Novato, CA (US); Rocco Ancona, San Jose, CA (US)

(73) Assignee: Dell Products L.P., Round Rock, TX (US)

( * ) Notice: Subject to any disclaimer, the term of this patent is extended or adjusted under 35 U.S.C. 154(b) by 312 days.

(21) Appl. No.: 17/159,578

(22) Filed: Jan. 27, 2021

(65) Prior Publication Data

US 2022/0239889 A1  Jul. 28, 2022

(51) Int. Cl.
| | |
|---|---|
| H04N 13/246 | (2018.01) |
| H04N 13/243 | (2018.01) |
| H04N 5/33 | (2023.01) |
| G06T 7/593 | (2017.01) |
| G06T 7/80 | (2017.01) |
| H04N 23/90 | (2023.01) |

(52) U.S. Cl.
CPC .......... *H04N 13/246* (2018.05); *G06T 7/596* (2017.01); *G06T 7/80* (2017.01); *H04N 5/33* (2013.01); *H04N 13/243* (2018.05); *H04N 23/90* (2023.01); *G06T 2207/10024* (2013.01); *G06T 2207/10048* (2013.01); *G06T 2207/20016* (2013.01); *G06T 2207/20221* (2013.01)

(58) Field of Classification Search
CPC ...... H04N 13/246; H04N 5/33; H04N 13/243; H04N 23/90; H04N 2013/0081; G06T 7/596; G06T 7/80; G06T 2207/10024; G06T 2207/10048; G06T 2207/20016; G06T 2207/20221
See application file for complete search history.

(56) References Cited

U.S. PATENT DOCUMENTS

| | | | |
|---|---|---|---|
| 8,451,352 B2 | 5/2013 | Hayasaka et al. | |
| 9,131,220 B2 | 9/2015 | Givon | |
| 9,172,871 B2 | 10/2015 | Zhao et al. | |
| 9,794,479 B2 | 10/2017 | Lyon | |
| 9,826,139 B2 | 11/2017 | Fukuda | |
| 10,430,994 B1* | 10/2019 | Baker | G06T 7/55 |
| 10,523,925 B2 | 12/2019 | Woodman | |
| 10,554,882 B2 | 2/2020 | Zhang | |
| 2018/0350087 A1* | 12/2018 | Kowdle | G06T 7/337 |
| 2019/0196400 A1* | 6/2019 | Chang | G03H 1/0808 |

* cited by examiner

*Primary Examiner* — Mekonnen D Dagnew
(74) *Attorney, Agent, or Firm* — Zagorin Cave LLP; Robert W. Holland

(57) ABSTRACT

Spatial image data captured at plural camera modules is fused into rectangular prism coordinates to support rapid processing and efficient network communication. The rectangular prism spatial imaging data is remapped to a truncated pyramid at render time to align with a spatial volume encompassed by a superset of imaging devices. A presentation of a reconstructed field of view is provide with near and far field image capture from the plural imaging devices.

18 Claims, 7 Drawing Sheets

DYNAMIC-BASELINE IMAGING ARRAY WITH REAL-TIME SPATIAL DATA CAPTURE AND FUSION

BACKGROUND OF THE INVENTION

Field of the Invention

The present invention relates in general to the field of information handling system visual image processing, and more particularly to a dynamic-baseline imaging array with real-time spatial data capture and fusion.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One common function provided by information handling systems is the capture, communication and analysis of visual images. Digital imaging devices are used in diverse fields ranging from telecommunications, vehicle sensing, medical imaging, portable consumer devices, surveillance and other applications. Modern digital imaging devices operate at the limits of science to allow extreme miniaturization and low power consumption. Traditionally, digital imaging captured images in two dimensions; however, more advanced applications often relay on three dimensional digital images. For example, conventional videoconferences use a two dimensional camera to capture and stream visual images of the participants; more advanced communications use real-time spatial capture of a human speaker to enhance the telepresence capability for more realistic collaboration, such as with three dimensional digital images that support virtual and/or augmented reality. Although spatial digital imaging offers more realistic interactions, many obstacles have slowed its adoption. For instance, accurate capture of spatial digital images often use large, expensive and delicate equipment that capture large amounts of data, which makes communication less robust. Wide scale deployment of spatial digital imagining applications and devices at a consumer level will depend likely have to await improvements in image capture and information handling system computational capabilities.

Generally, spatial digital images are captured with three types of digital imaging systems. One type is a passive stereo array that uses plural imaging devices to capture two dimensional images from an offset of a baseline distance, resulting in a parallax shift of image features between the multiple views. By triangulating the parallax between observed features and know physical positions of the imaging devices, an estimated distance to each feature can be computed. Since passive stereo arrays rely on feature matching between images, a lack of features tends to detract from image quality, such as with low contrast backgrounds. Another type of digital imaging system is an active stereo array that uses plural imaging devices as with passive stereo arrays but further assisted by a texture/pattern projection device, such as an infrared projection device that helps provide feature fill and thereby substantially increase performance in low contrast backgrounds. Active stereo arrays tend to provide improved nearfield and midfield images with image quality tending to decrease as distance approaches the limit of the effective range of the pattern projection device. Although projection helps with image quality, the accuracy limitations associated with passive stereo arrays remain, such as relating to imprecise placement of the imaging devices, and the projection falls short where light conditions and distance limit the effectiveness of the projected illumination. A third type of digital imaging device is a time of flight imager, which does not have to have multiple offset image capture devices. Such imagers compute precise distances to objects by capturing a time of flight for infrared light to reflect from an object. Generally, time of flight sensors have a relatively low resolution due to the large pixel areas that are used to capture reflected light with sufficient timing accuracy.

Even where expensive and specialized image capture devices are available to capture spatial images, such images tend to have a large file size that makes storage and communication difficult. A digital spatial image is typically defined as a cube of pixels so that the spatial image has a square of the two dimensional image in data size. Processing, communicating and presenting such large files of data tends to require expensive and powerful processing resources and high bandwidth. A system and method are needed to provide real-time spatial data capture with processing and file size efficiencies.

SUMMARY OF THE INVENTION

Therefore, a need has arisen for a system and method which provide real-time dynamic-baseline imaging array capture with real-time spatial data capture and fusion.

In accordance with the present invention, a system and method are provided which substantially reduce the disadvantages and problems associated with previous methods and systems for capturing, processing and communicating spatial digital images. Spatial visual information captured at plural imaging devices has coordinate fusion applied to define a reconstructed field of view supported in a rectangular prism memory definition that aids rapid processing and efficient storage and communication of the spatial visual image information.

More specifically, an information handling system processes spatial visual image information to present a reconstructed field of view at a display generated from a fused set of visual images captured by an arbitrary number of space camera modules. For example, each of plural camera modules captures near and far field views of a target object with depth information, such as supported by a pattern infrared projector. The image capturing devices dynamically create virtual baselines to refine depth measurements of specific features. Based upon the virtual baselines, networked camera modules automatically associate into a combined imaging array of arbitrary complexity and scale. For example, a series parallel coordinate fusion across the plural imaging devices combines spatial visual imaging information into a rectangular prism memory space that efficiently stores the reconstructed field of view image. In one example embodiment a depth resolution optimized coordinate system applies a progressive depth measurement approach to accurately define features, such as with an initial low resolution image that identifies features to trigger a higher resolution spatial measurement by different imaging devices.

The present invention provides a number of important technical advantages. One example of an important technical advantage is that an arbitrarily complex array of simple digital imaging devices and accompanying projection devices simultaneously capture accurate spatial information in both near and far field domains in a computationally efficient manner. Spatial information efficiently estimated from plural devices provides a dynamically measured and refined spatial extrinsic calibration model in near real-time capacity. Optical properties of the captured spatial images are optimized for desired applications with outlier suppression and statistical sampling to reduce false spatial data points and temporal noise in valid data points. A pre-optimized spatially aware cascading search algorithm improves search speed of a multi-baseline stereo vision system with efficient computing through dense spatial datasets. Dynamic optimization maintains robust function during periods of partial occlusion. A computationally and bandwidth efficient method of transmitting and rendering real time spatial video information is provided through an observer optimized voxel mapping scheme and an efficient spatial data format.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system provides a dynamic-baseline imaging array with real-time spatial data capture and fusion. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
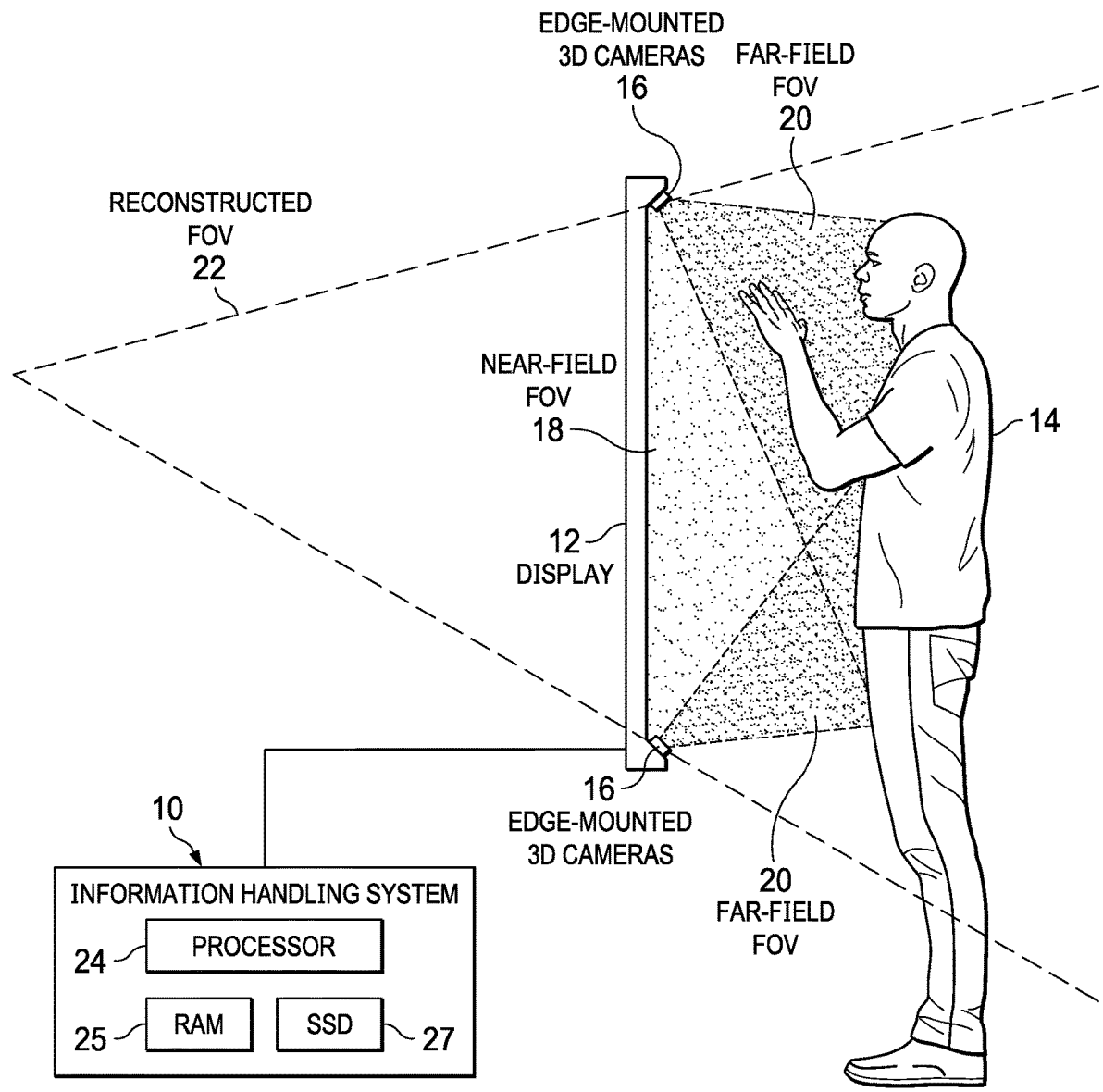
FIG. 1 depicts a dynamic-baseline imaging array with real-time spatial data capture and fusion.

Referring now to FIG. 1, a dynamic-baseline imaging array is depicted with real-time spatial data capture and fusion. In the example embodiment, an information handling system 10 interfaces with a display 12 to present visual images, such as of a video conference received through a network interface. For example, information handling system 10 executes instructions on a processor 24 to process information. The instructions and information are stored in random access memory (RAM) 25 and retrieved from non-transitory memory of a solid state drive (SSD) 27 at runtime. Plural arrays of edge mounted three-dimensional cameras 16 capture visual images of an end user 14 for communication to information handling system 10, such as in support of a videoconference. Three dimensional cameras 16 capture visual images from plural locations about display 12, such as with near-field fields of view (FOV) 18 and far-field FOV 20 that are fused to provide a reconstructed FOV 22 that offers a spatial image in near real time for communication as efficiently packaged data at information handling system 10. In an example such as that shown, visual spatial information that includes a three dimensional representation of the reconstructed field of view includes two dimensional visual images captured by edge mounted camera modules 16 and fused into a comprehensive representation for communication through a network to support a video conference.

Generally, a fused spatial reconstructed FOV 22 is generated through dynamically created virtual baselines that define positional relationships across multiple three dimensional cameras 16 to refine depth measurements of specific features captured by the cameras, such as end user 14. Plural three dimensional cameras 16 automatically associate into a combined imaging array of arbitrary complexity and scale so that a series parallel coordinate fusion is performed across multiple modules. The spatial fusion is performed by employing the use of a field of view and depth resolution-optimized coordinate system. Efficient management of spatial imaging data through this depth resolution optimized coordinate system enables near-field spatial capture through edge mounted network of depth camera modules. Generating reconstructed FOV 22 enhances spatial image data by adding several layers of reinforcement to each estimated depth measurement. This improves the reliability of image capture and reduces the risk of erroneous measurements, which can hamper multiple use cases. The envelope of measurement extends beyond the resolution of any individual depth camera by creating and referencing measurement baselines across multiple three dimensional camera modules. For example, even where three dimensional camera modules are limited to accurately computing near field measurements of depth in isolation, comparison against measurement baselines allows both very near field and very far field measurements with accuracy. Dense depth information fused from plural imaging devices may be streamed to information handling system 10 supported by commodity-level serial I/O communication interfaces, such as by daisy-chaining with ASIC-based on-module coordinate fusion to simplify the I/O design and enable applications in low cost consumer-type devices, such through USB interfaces.

Efficient data management with an optimized voxel based fusion, as is described below in greater depth, offers improved real-time capabilities and more options for communicating image data. In one embodiment, depth measurements are optimized for specific use cases by dynamically adjusting the locus of priority and precision required. For example, a near field holographic communication use case may create only small baselines to reduce processed data and may compress all background data into a single depth plane. To improve processing time in support of real time image transfer, depth data is fused without the use of meshing, which is computationally expensive and restricted to high end processing devices. Memory and processing requirements are reduced by optimized memory structures, with as much as a 100× reduction in memory footprint. A super resolution approach may be implemented where desired to coordinate spatial data fusion so that individual imaging device resolution may be decreased.

Figure 2A:
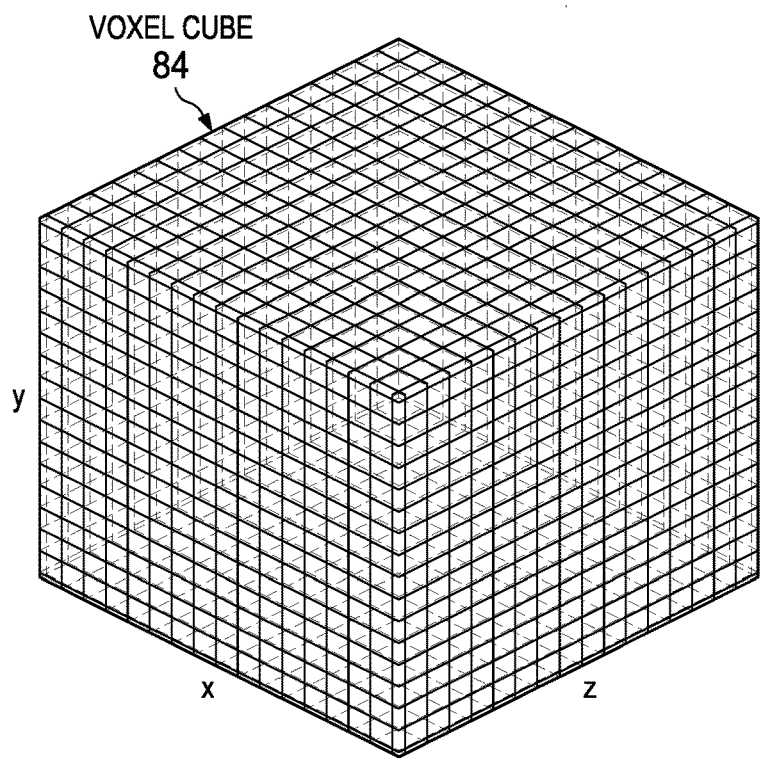
FIGS. 2A, 2B and 2C depict a graphical image of memory allocation for spatial visual images.
Figure 2B:
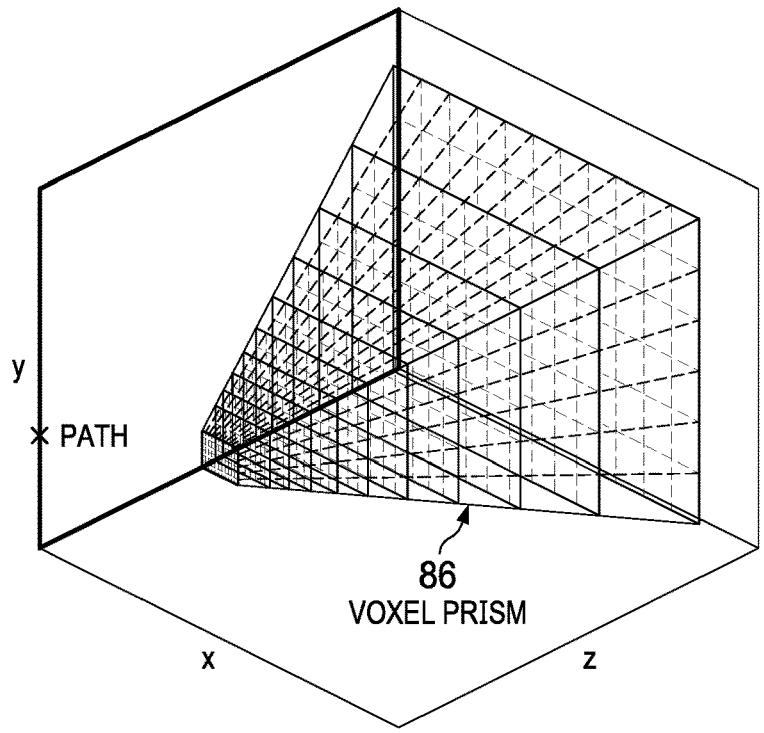
Figure 2C:
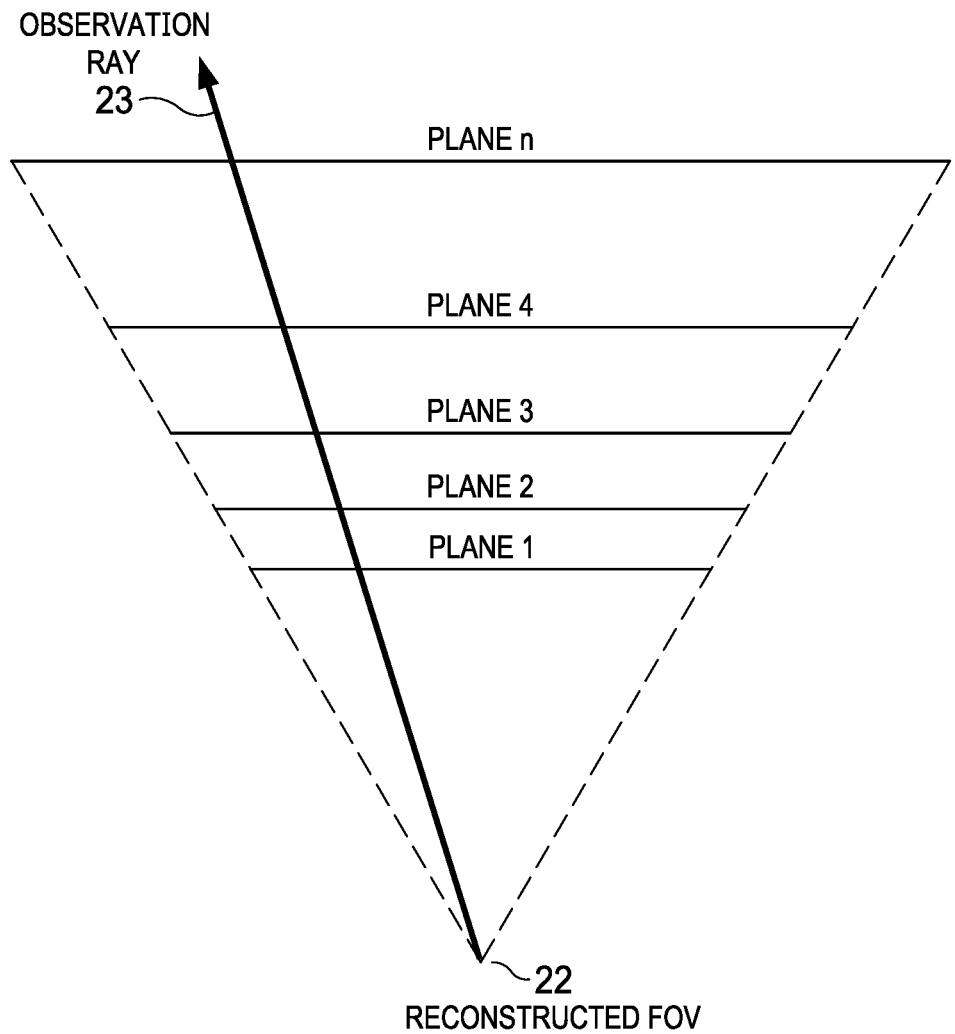

Referring now to FIGS. 2A, 2B and 2C, a graphical image depicts a memory footprint allocation for spatial visual images. For example, visual spatial information may be stored in random access memory (RAM) during presentation and communication, and in non-transitory memory, such as flash memory, for persistent storage. FIG. 2A depicts a native memory space that represents spatial image data coordinate space at a minimal precision needed to resolve voxels of image data in a near field of sufficient resolution. The native memory space results in an oversampling in the far field, especially with respect to the Z axis representing depth where imaging devices themselves have limited resolving capability. In one example embodiment, a 1000×1000 pixel output at 1 mm:1 px resolution with a maximum depth of 5 meters and a 90 degree reconstructed field of view requires a coordinate space capable of storing 125 billion voxels in 375 GB of memory per frame at an 8-bit RGB resolution per voxel. FIG. 2B depicts an example of a more efficient memory space defined to store fused spatial image data of plural depth capture data streams. The X and Y axes scale and precision are pre-optimized and determined by the output resolution and reconstructed field of view of the desired use case. The Z axis scale and precision is set at or below the maximum precision of the underlying depth imagers in this axis. The combined dataset is quantized into a series of discrete depth planes based on the provided pre-optimization values provided by the user application, so that only the minimum required number of depth planes are provided to the information handling system, thereby reducing the strain on processing and memory components. Novel views of the of the dataset may be rendered by arranging each depth plane of the dataset at the appropriate distance and scale from the virtual observer/camera, so as to align the edges of each depth plane precisely with the edges of the virtual camera's field of view. Thus, all linear paths originating from the virtual camera contained within the bounds of the field of view shall pass through all virtual depth planes. With this memory scheme, the same 1000×1000 pixel output, when quantized in the Z dimension to 128 values, and culled to a constant x/y resolution by the rendered field of view, would only require 38 MB of physical memory per frame, an improvement of approximately 976× over the native memory scheme of FIG. 2A, without any perceivable loss of quality at render time, as the relevant precisions and portions of the data for the chosen view is fully preserved A 384 MB memory footprint makes this scheme suitable for portable electronics devices such as mobile phones and laptop computers, which commonly have at least 2 GB of physical RAM at the time of authorship. FIG. 2C shows how an observation ray 23 is directed from a reconstructed field of view 22 to determine the view presented to a virtual observer. All planes 1 through n have the same X/Y resolution, but each plane's density varies depending on where they are observed from. For example, if all planes have 100 pixels of horizontal resolution, Plane 1, representing a physical dimension of perhaps only two feet would have a renderable resolution of 50 pixels per foot. Plane 4, which may represent a much larger physical dimension of perhaps 10 feet, would have a renderable resolution of 10 pixels per foot. This is the same limitation of both the depth camera and the observer upon which the memory key optimization scheme is formed.

Figure 3:
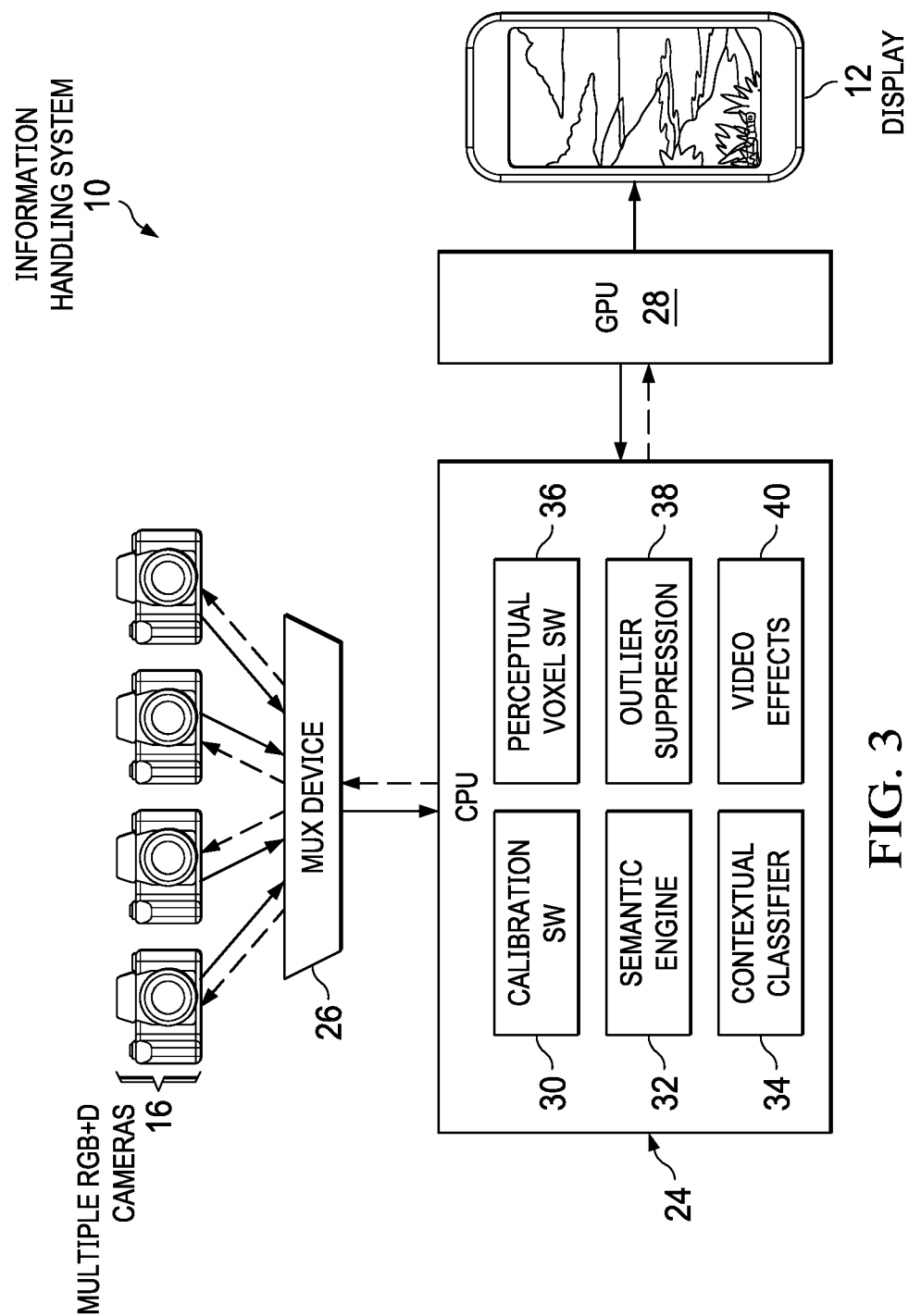
FIG. 3 depicts a block diagram of a three dimensional camera module that captures spatial images for fusion into a composite image.

Referring now to FIG. 3, a block diagram depicts plural three dimensional camera modules 16 that capture spatial images for fusion into a composite image. In the example embodiment, three dimensional camera modules 16 are each active stereo arrays having a multi-view trinocular module of three RGB/IR cameras that each capture a two-dimensional visual images and a pattern projector illuminater that emits infrared illumination. Captured images are provided from individual cameras to a multiplexer device 26 for communication to a processor 24. Calibration software 30 on processor 24 compares visual images captured by each individual camera to determine a relationship of each individual camera to the others. For instance, a middle camera of each module 16 provides a baseline against which the outer cameras of that module are compared to provide three-dimensional features. Calibration software 30 determines a relationship between camera modules 16, such as by comparing the baseline for each individual module against sensed features captured by other modules. A semantic engine 32 analyzes the content of each camera's captured image to align features and support calibration. In addition, semantic engine 32 provides an understanding of objects in a field of view, such based upon object recognition across plural spatial images. A contextual classifier 34 analyzes context to segment an image into different regions, such as a background, foreground and objects of interest. In addition, contextual classifier can store contextual information related to the calibration, such as where the analyzed image is captured at a known location and objects detected in the image so that stored calibration and semantics may be used to more rapidly perform processing of spatial visual information. As an example, one context may involve a known identification of an arbitrary number of multi-view imaging devices at a plural locations of a network and their relative extrinsic differences. Storing context helps reduce calibration times during initial setup by having preliminary positional data on camera module relative positions.

Once plural camera modules 16 are identified and calibrated relative to each other, perceptual voxel software executing on processor 24 fuses spatial image data across plural camera modules 16 to achieve a composite image built around the reconstructed field of view, such as in the data structure shown by FIG. 2B. For example, perceptual voxel software executes to gather real-time depth and video information from the multiple camera modules 16 by employing series parallel coordinate fusion. During fusion across spatial image information of camera modules 16, coordination with calibration software 30 supports autonomous dynamic recalibration to refine calibration features based upon image features extracted by semantic engine 32. An outlier suppression module 38 monitors image voxels to detect outlier effects in the presented image, such as for anomalies in objects sensed over time, and suppresses the outliers from the voxel memory space. A video effects module 40 aids in rendering of visual images with desired effects, such as faithful and unfaithful content additions. The video output is streamed to a graphics processor 28 for presentation at display 12.

An important advantage provided by perceptual voxel software 36 is that the memory efficient spatial image analysis provides the pre-optimized rectangular prism structure depicted by FIG. 2B. Real time depth and video information is combined into a single unified coordinate space while employing super resolution techniques, meaning that the coordinate space into which the multiple image inputs are combined may have a higher resolving power in one or more axes than is supported by any individual depth imaging component of the system via oversampling. The combined dataset is quantized into a series of discrete depth planes based on the provided pre-optimization values provided by the user application, so that only the minimum required number of depth planes are provided to the information handling system, thereby reducing the strain on processing and memory components. Novel views of the of the dataset may be rendered by arranging each depth plane of the dataset at the appropriate distance and scale from the virtual observer/camera, so as to align the edges of each depth plane precisely with the edges of the virtual camera's field of view. Thus, all linear paths originating from the virtual camera contained within the bounds of the field of view shall pass through all virtual depth planes. Efficient memory definition aids in efficient processing to refine visual images, such as by removing outliers between multiple module data sets using spatial and temporal medians and averages, and by eliminating datapoints irrelevant to reconstructing the scene as directed by the user. As another example, efficient memory definition increases confidence for coordinate values of each voxel in a combined coordinate space based upon multi-sampling reinforcement and averaging. Efficient memory use further helps to effectuate network communication of spatial visual images in the rectangular prism format. For instance, spatial visual information is compressed and quantized into a series of depth planes and communicated as a plurality of distinct two dimensional data streams with metadata specifying their Z offset and general description, such as the subject or background of the image. In addition, three dimensional features may be labeled and tracked based upon two dimensional training datasets.

Figure 4A:
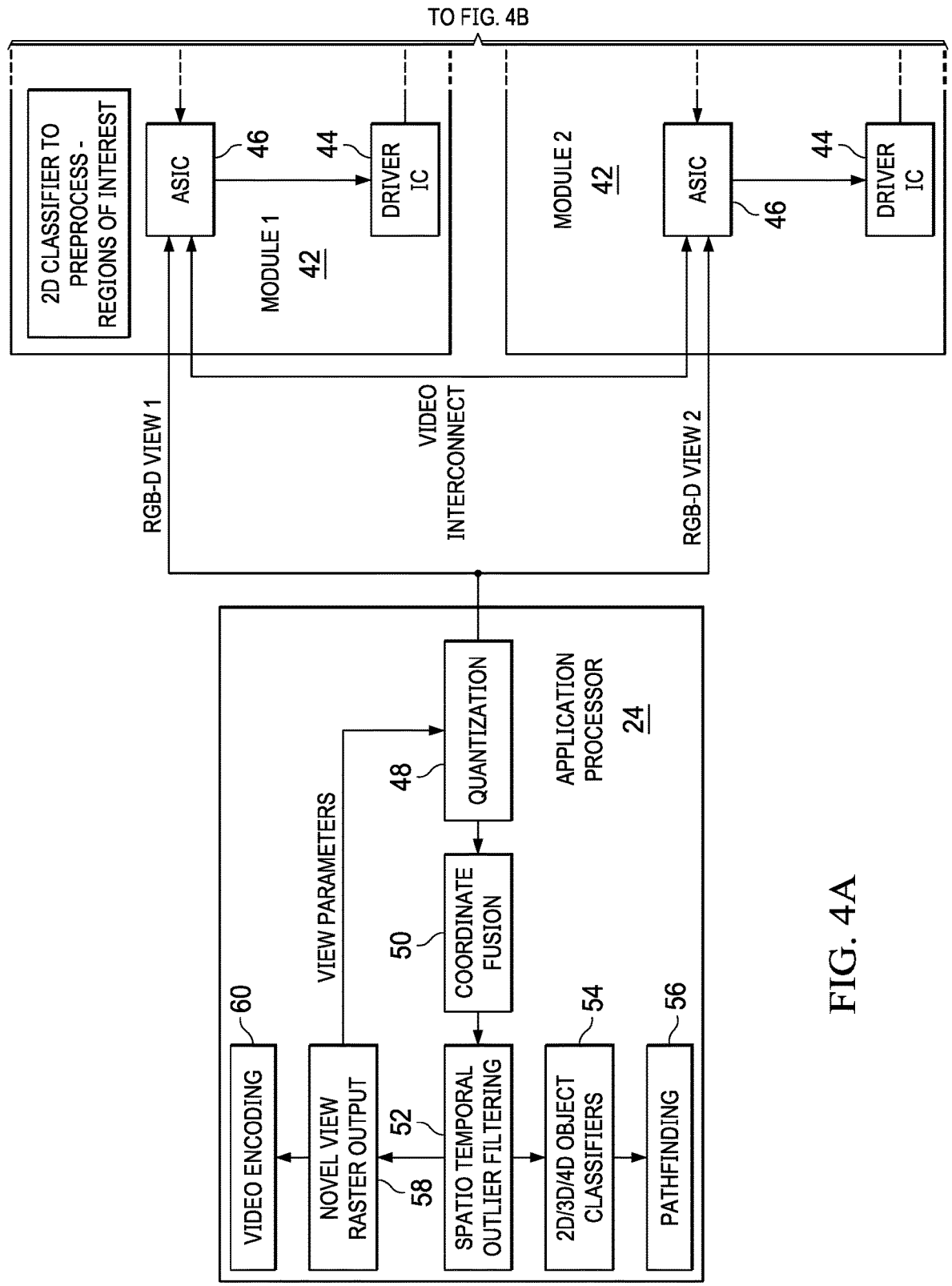
FIGS. 4A and 4B depict a system for capture of fused spatial images by plural camera modules.
Figure 4B:
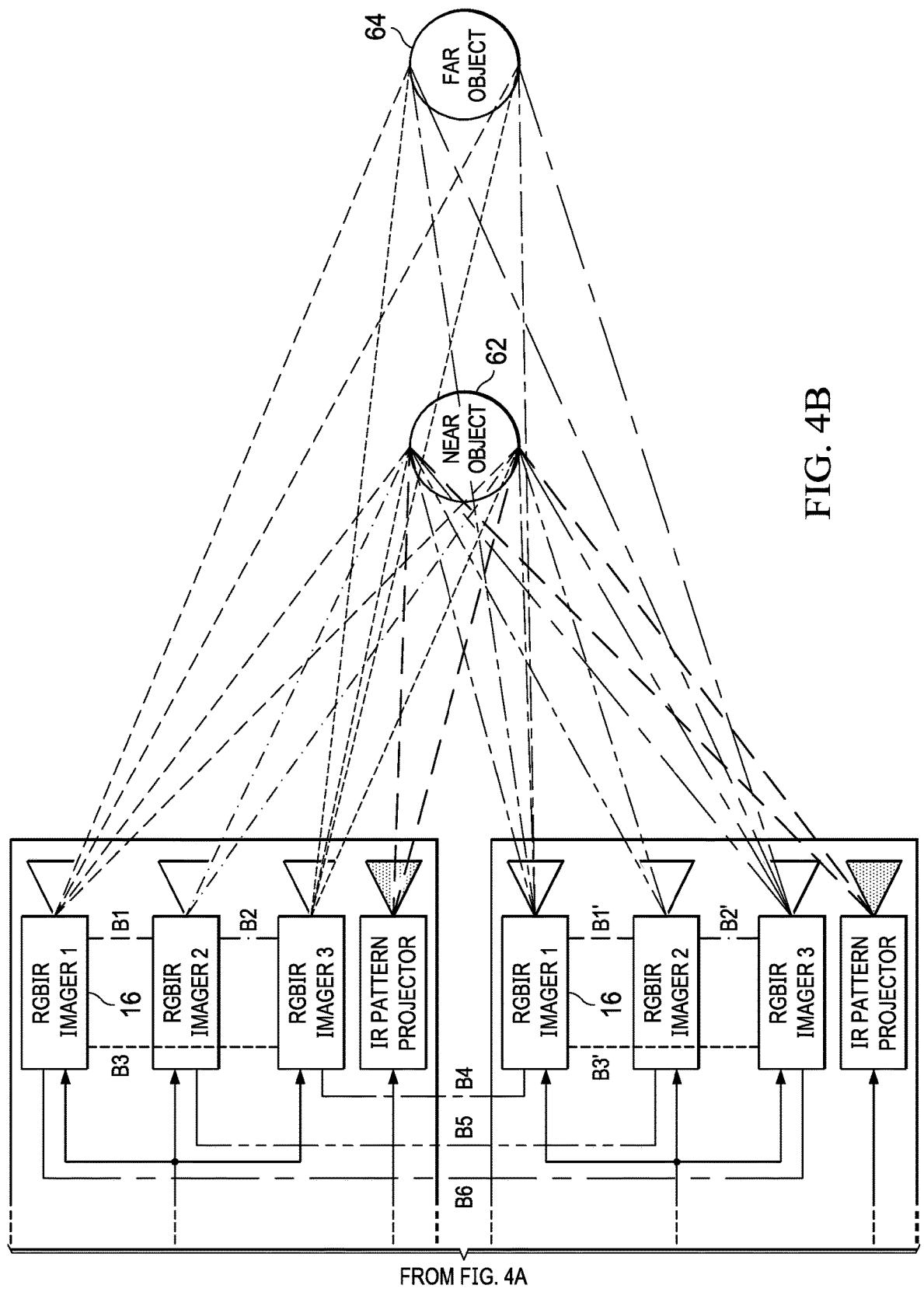

Referring now to FIGS. 4A and 4B, a system is depicted for capture of fused spatial images from plural camera modules 16. In the example embodiment, first and second camera modules 16 each have three RGB/IR image sensors and one infrared pattern projector directed towards a field of view having a near object 62 and a far object 64. As is illustrated by the dotted lines, each image sensor captures near object 62, however, far object 64 is occluded from capture by centrally located image sensors but captured by outer image sensors. Each camera module 16 includes driver integrated circuit 44 to coordinate interactions of the imaging and projection devices and an application specific integrated circuit (ASIC) 46 to process spatial visual images for communication to processor 24. ASICs 46 interface with each other to share visual image data, such as for two dimensional classifiers that preprocess regions of interest from the different fields of view. Although the example embodiment depicts only two camera modules 16, an arbitrary number of randomly positioned camera modules may be used. The visual spatial information is stored in memory and provided to processor 24 for processing. In the example embodiment, processor 24 retrieves instructions to perform the depicted operations from a non-transient memory, such as a solid state drive (SSD), and executes the instructions in RAM to adapt the spatial visual information for presentation and communication.

Processor 24 manages spatial image information with a quantization operation 48, which pre-optimizes spatial image data by reducing the resolution of the incoming data to meet the output resolution so that unnecessary image processing is avoided. A coordinate fusion operation 50 is performed on the pre-optimized data to fuse the spatial image data into the rectangular prism memory space as described above. The fused spatial visual data next has a spatio temporal outlier filtering operation 52 that compares object position and time information to remove inaccurate artifacts. Once the filtering is complete, the spatial image has a novel view raster output operation 58 that offers a computationally efficient rendering of high fidelity novel views of the spatial image data using voxel to raster processing, raytracing, and other common rendering schemes. The processed visual image is then video encoded at 60 to present at a display and/or communicate through a network. After filtering of the spatial image data operation at 52, other processing steps may be performed dependent on the use case for the spatial image data. In the example embodiment, a two dimensional, three dimensional, four dimensional object classifier operation 54 is performed to identify predetermined object forms, such as people, walls or posts in support of autonomous vehicle navigation. A pathfinding operation 56 then applies objects identified to support a navigation or similar use case.

The physically separate camera modules 16 help to illustrate the physical relationship associated with calibration of spatial image data as described above. A progressive depth measurement approach is applied using low resolution spatial measurements between set of imaging devices to trigger high resolution spatial measurements between a different set of imaging devices chosen from a superset of all available imaging devices according to the position and relative baseline against a target feature in the field of view. All potential baselines, such as may be defined as an axis extending from a central imaging device within camera module 16, between all system imagers are enumerated and each baseline is categorized based on its coverage of the relevant coordinate space and its relative resolving power relative to feature distances. As an initial operation, a selection of image-triplets from near field optimized baselines is analyzed with a reduce resolution image to allow rapid processing. Each feature in the center reference image is assigned a coarse depth value, binning the pixel into a quantized set of depth regions, such as close, medium, far and very far. Based on the assigned coarse depth value, several suitable baseline pairs or triplets are selected from the superset of suitable baselines, and the pre-optimized search spaces are loaded into memory to perform an efficient stereo matching process. Once the feature has been assigned finer depth estimation values from one or more optimized baselines, the weighted average depth values for those pixels are written into the local frame buffer.

Figure 5:
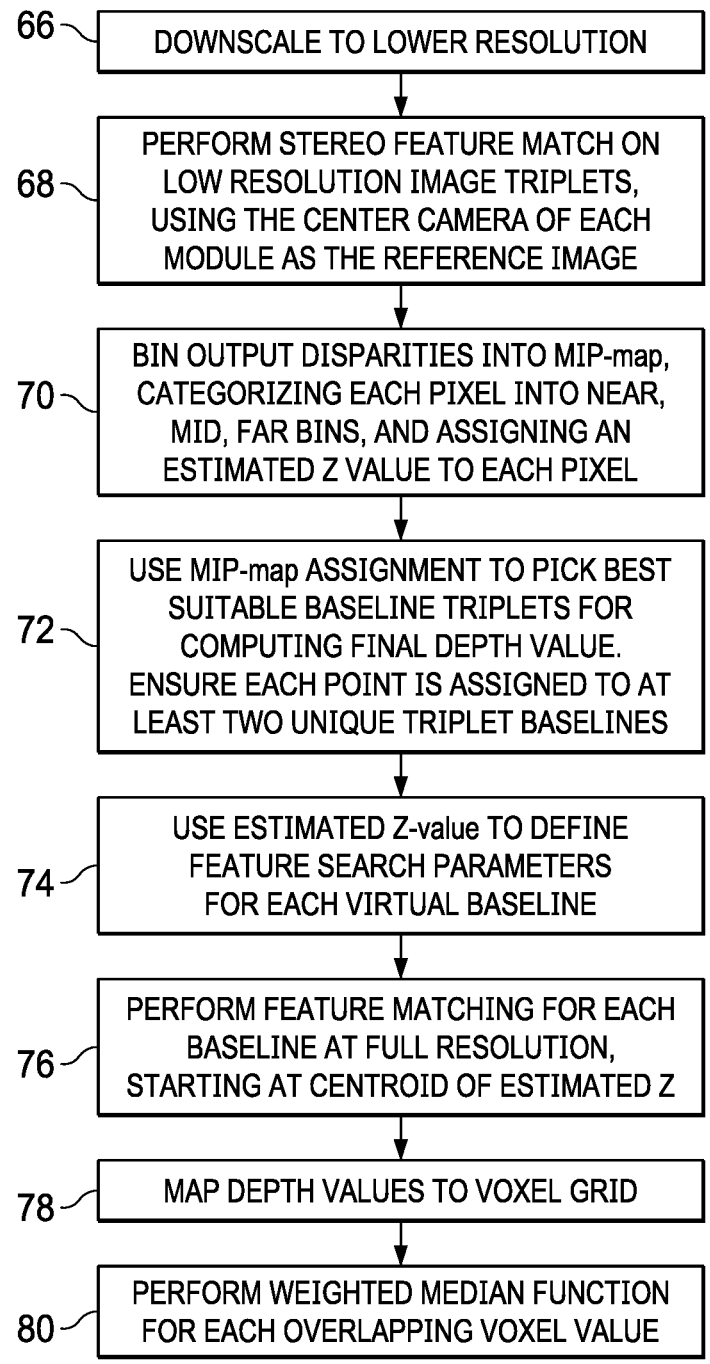
FIG. 5 depicts a flow diagram of a process for managing spatial image data capture and fusion.

Referring now to FIG. 5, a flow diagram depicts a process for managing spatial image data capture and fusion. The process starts at step 66 by downscaling captured spatial images to a lower resolution for initial processing and establishing a baseline of relative camera positions. At step 68, a stereo feature match is performed at the lower resolution image triplets, preferentially using the center camera of each camera module as the reference image. At step 70, output disparities of the feature match are binned into a MIP-map categorizing each pixel into near, mid and far bins. A Z value for depth of each pixel is estimated and assigned. At step 72, the MIP-map assignment is used to pick a best suitable baseline triplet of cameras for computing final depth values, and each point is assigned to at least two unique triplet baselines. At step 74, the estimated Z-values are used to define feature search parameters for each of the virtual baselines of the camera modules. At step 76, feature matching is performed with the feature search parameters for each baseline at full image resolution starting at a centroid of the estimated Z value. At step 78, the depth values are mapped to the voxel grid. At step 80, a weighted median function is performed for each overlapping voxel value to define a composite spatial image.

Although the present invention has been described in detail, it should be understood that various changes, substitutions and alterations can be made hereto without departing from the spirit and scope of the invention as defined by the appended claims.

What is claimed is:

1. An information handling system comprising:
 a processor operable to execute instructions that process information;
 a memory interfaced with the processor and operable to store the information;
 plural camera modules directed at an object and interfaced with the processor, each of the plural camera modules operable to capture spatial visual images; and
 a non-transitory memory storing instructions that when executed on the processor cause;
 a calibration of at least a first and second of the plural camera modules; and
 a fusion of spatial image information of the first and second of the plural camera modules to a rectangular prism coordinate space.

2. The information handling system of claim 1 further comprising:
 a display operable to present the spatial image information as visual images;
 wherein the instructions further map the rectangular prism coordinates to a truncated pyramid to render at the display.

3. The information handling system of claim 2 wherein the instructions further pre-optimize spatial visual information captured by the first and second camera modules to resolution associated with the display before fusion of the spatial image information.

4. The information handling system of claim 1 wherein the instructions further stores depth information associated with the fusion of the spatial image information as a distinct stream.

5. The information handling system of claim 1 wherein the instructions for calibration further:
 capture spatial visual information with one of the plural camera modules at a first resolution;
 select one or more features at the first resolution to assign a coarse depth value;
 capture spatial visual information with a second of the plural camera modules at a second resolution of greater than the first resolution; and
 stereo matching the one or more features of the spatial visual information captured in the first and second resolutions.

6. The information handling system of claim 1 wherein each of the plural camera modules comprises three cameras that each capture visible and infrared illumination and a pattern projector that illuminates infrared light.

7. The information handling system of claim 1 wherein the instructions further temporally compare the spatial visual information to detect image outliers for suppression.

8. The information handling system of claim 1 wherein the instructions further compress and quantize depth information of the spatial visual information into a series of plural depth planes.

9. The information handling system of claim 1 wherein the instructions further segment the spatial visual image into regions that include at least background and the object.

10. A method for managing spatial visual image information of an object, the method comprising:
 capturing spatial visual image information at plural camera modules;
 calibrating the spatial visual images with estimates of at least depth of the plural camera modules relative to the object;
 fusing the spatial visual image information of the plural camera modules to a common dataset; and
 quantizing the combined dataset into a series of depth planes of equal resolution, with each plane represented in memory as an X/Y matrix of RGB pixel values.

11. The method of claim 10 further comprising:
 rendering a novel view of the dataset by arranging each depth plane of the dataset at the appropriate distance and scale from a virtual observer so as to align the edges of each depth plane with the edges of the virtual observer field of view.

12. The method of claim 11 further comprising pre-optimizing spatial visual information captured by the plural camera modules to a resolution associated with the rendering before the fusing.

13. The method of claim 10 further comprising storing depth information associated with the fusing as a distinct stream.

14. The method of claim 10 wherein the calibrating further comprises:
 capturing spatial visual information with one of the plural camera modules at a first resolution;
 selecting one or more features at the first resolution to assign a coarse depth value;
 capturing spatial visual information with a second of the plural camera modules at a second resolution of greater than the first resolution; and
 stereo matching the one or more features of the spatial visual information captured in the first and second resolutions.

15. The method of claim 10 wherein each of the plural camera modules comprises three cameras that each capture visible and infrared illumination and a pattern projector that illuminates infrared light.

16. The method of claim 10 further comprising temporally comparing the spatial visual information to detect image outliers for suppression.

17. The method of claim 10 further comprising
 compressing and quantizing depth information of the spatial visual information into a series of plural depth planes; and
 communicating the plural depth planes through a network.

18. The method of claim 10 further comprising segmenting the spatial visual image into regions that include at least a background and the object.

* * * * *

UNITED STATES PATENT AND TRADEMARK OFFICE
CERTIFICATE OF CORRECTION

| | |
|---|---|
| PATENT NO. | : 11,665,330 B2 |
| APPLICATION NO. | : 17/159578 |
| DATED | : May 30, 2023 |
| INVENTOR(S) | : Maxwell S. Andrews and Rocco Ancona |

It is certified that error appears in the above-identified patent and that said Letters Patent is hereby corrected as shown below:

In the Claims

Column 10, Claim 10, Line 29 please insert --red, green, blue or-- before "RGB" and insert --where X and Y are axes scales-- after "values"

Signed and Sealed this
Fourth Day of July, 2023

Katherine Kelly Vidal
*Director of the United States Patent and Trademark Office*